United States Patent [19]

James

[11] 4,308,713
[45] Jan. 5, 1982

[54] HYDRAULICALLY DRIVEN MOWER

[75] Inventor: Ronald N. James, Seguin, Tex.

[73] Assignee: Terrain King Corporation, Seguin, Tex.

[21] Appl. No.: 144,312

[22] Filed: Apr. 28, 1980

[51] Int. Cl.³ .................... A01D 69/00; A01D 73/00; A01D 55/264
[52] U.S. Cl. ........................................ 56/11.9; 56/6
[58] Field of Search .................... 56/6, 11.9, 13.4; 165/179, 181, 177

[56] References Cited

U.S. PATENT DOCUMENTS

| | | | |
|---|---|---|---|
| 2,673,437 | 3/1954 | Pollock et al. | 56/11.9 |
| 2,920,434 | 1/1960 | Ingram | 56/6 |
| 3,135,079 | 6/1964 | Dunn | 56/6 |
| 3,665,685 | 5/1972 | Allard | 56/11.9 |
| 3,720,048 | 3/1973 | Grubb et al. | 56/15.9 |
| 3,736,735 | 6/1973 | Kulak et al. | 56/6 |
| 3,832,835 | 9/1974 | Hall et al. | 56/11.9 |
| 3,885,622 | 5/1975 | McLain | 165/179 |
| 3,973,379 | 8/1976 | Ecker et al. | 56/11.9 |
| 4,009,556 | 3/1977 | Molzahn | 56/11.9 |
| 4,087,955 | 5/1978 | Szymanis | 56/13.4 |

*Primary Examiner*—Paul J. Hirsch
*Attorney, Agent, or Firm*—Cox & Smith Incorporated

[57] ABSTRACT

A hydraulically driven mower having a mower deck with conduit means in contact with the deck for flowing hydraulic fluid which powers hydraulic motors for driving cutting blade means positioned below the mower deck so that air flow created by the cutting blade means will provide heat transfer from the hydraulic fluid in the fluid conduit means through the deck member to provide cooling of the hydraulic fluid and a hydraulic drive system having a pressure relief means to direct hydraulic fluid supplied to a first hydraulic motor in series to the next hydraulic motor in series when the first hydraulic motor overloads to maintain sufficient hydraulic power to the second motor.

7 Claims, 4 Drawing Figures

HYDRAULICALLY DRIVEN MOWER

BACKGROUND OF THE INVENTION

This invention relates generally to hydraulically driven mowing machines or mowers and more particularly to large roadside mowers of the type propelled or pulled by a tractor or other vehicle.

The use of hydraulic motors to power mowing machines or other implements is known in the art. Examples of mowing machines which have hydraulically driven cutting means are found in the following U.S. Patents:

U.S. Pat. No. 2,166,940—C. M. Conradson
U.S. Pat. No. 2,603,052—C. L. Pelham
U.S. Pat. No. 2,840,974—T. J. Dunn Et Al
U.S. Pat. No. 2,888,088—A. Claas Et Al
U.S. Pat. No. 3,087,296—J. T. Cowles
U.S. Pat. No. 3,135,079—T. J. Dunn
U.S. Pat. No. 3,221,482—R. E. Cowling
U.S. Pat. No. 3,263,036—R. W. Bailey Et Al
U.S. Pat. No. 3,319,407—B. L. Jordan Et Al
U.S. Pat. No. 3,404,518—H. D. Kasper
U.S. Pat. No. 3,462,925—J. K. Lanier
U.S. Pat. No. 3,498,036—R. E. Cowling Et Al
U.S. Pat. No. 3,511,033—R. K. Strasel
U.S. Pat. No. 3,526,083—R. O. Barry Et Al
U.S. Pat. No. 3,563,012—R. K. Strasel
U.S. Pat. No. 3,727,712—M. J. Colloton
U.S. Pat. No. 3,788,418—Clancey Et Al
U.S. Pat. No. 3,832,835—Hall Et Al
U.S. Pat. No. 3,854,271—E. J. Aldred
U.S. Pat. No. 3,949,539—J. O. Cartner
U.S. Pat. No. 3,973,379—F. A. Ecker Et Al.

In particular, in U.S. Pat. Nos. 2,603,052 and 2,840,974 there are shown hydraulically powered sickle mowing machines. In U.S. Pat. No. 3,511,033, there is shown a rotary reel-type mowing machine which is hydraulically-powered. There are many examples of hydraulically-powered rotary mowing machines such as that shown in U.S. Pat. No. 3,135,079.

The use of hydraulic power has particular utility for multiple unit mowing machines as well as for side mounted and boom mounted mowing machines when the drive-train is not readily suited for a mechanical drive. Mowers such as shown in U.S. Pat. No. 3,404,518 and the enclosed brochure depicting the "TK-15" fifteen foot rotary mower of assignee Terrain King Corporation of Seguin, Texas generally require folding wing sections for transport. U.S. Pat. No. 3,404,518 attempts to solve the transporting problem of multiple gang mowers by having only the outer housing sections foldably mounted. In the case of the "TK-15" mower by Terrain King Corporation, the entire outer wing section folds for transport purposes. In the case of typical shaft driven sections, provision must be made for the folding.

It is desirable to eliminate the mechanical drive train of mowing machines since they can become quite complicated when multiple mowing units are provided. However, in the case of hydraulical motors, the efficiency of the motors and the heat generated in the hydraulic drive fluid may be a problem. Conventional hydraulic piston pumps and motors may be used on mowers because of their high efficiency. Gear-type pumps and motors are advantageous since they can be more easily controlled in the case of dividing flow for multiple motors.

A problem with large motors of the type shown in U.S. Pat. No. 3,135,079 is the heat generated in hydraulic drive fluid. Under heavy load conditions the hydraulic drive fluid may reach such a high operating temperatures that it can be damaged. Accordingly, some way must be provided to cool the hydraulic fluid to dissipate the heat created by the high pressure pumps and motors utilized. Increasing the amount of hydraulic fluid may help cooling. However, this increases the weight of the machine and adds to the cost of operating.

It is known in the prior art that radiators may be utilized to provide cooling to hydraulic fluid. Examples of such cooling devices are found in U.S. Pat. Nos. 2,166,940, 3,727,712 and 3,788,418. These devices use conventional radiators or heat exchangers which in the case of the latter two patents is positioned so that the cooling fan of an engine provides air flow to dissipate the heat. In the case of cooling fins, cuttings may cover or attach to the fins which may reduce their efficiency. It has also been known in the prior art to utilize structural components for conducting and storing hydraulic fluid. An example of this is shown in U.S. Pat. No. 2,888,088 and it is also known to utilize structural members such as in tractor front end fork-lifts and in construction machines and the like to store hydraulic fluid and to act as conduits. The use of frame members for flowing hydraulic fluid has also been known in mowing machines. However, so far as known the only cooling provided by flowing hydraulic fluid through the frame members occurs from radiation or free convection to the surrounding air.

Applicant first discovered that it could obtain adequate and efficient cooling for a hydraulically-driven mowing machine by circulating the return flow of hydraulic fluid through sealed structural members of the deck which members constitute rectangular tubing which forms the skeleton of the mower deck. The mower deck acts as a huge heat sink capable of dissipating the heat generated by the hydraulic system. The tubing and the deck have a continuous, forced flow of air circulating over their lower heat radiating surfaces which is generated by the up-draft-type blades of the mower. This creates a very efficient heat exchange using forced air convection to dissipate the heat with the up-draft blades also acting to suck up vegetation into the cutting plane. The high efficiency minimizes the required hydraulic fluid for cooling which reduces weight.

It was initially thought to be undesirable to utilize the structural members of the mower deck since this requires a special deck for a hydraulic-type mower. For purposes of economy and manufacturing it would be desirable to provide a mower deck which could be used for either a mechanical or a hydraulic-type mowing machine. It was thought that a heat exchanger which was not in the path of air flow of the cutting blades could be utilized. However, such a unit does not have the efficiency of utilizing the air flow from the blades and it is not believed to be as desirable. Not withstanding the increased cost to manufacture the mower deck whose structural members are suitable for flowing low pressure hydraulic fluid, such a device possesses numerous unexpected advantages over other types of cooling means for the hydraulic fluid.

When multiple hydraulic motors have been used it was previously believed that this could be accomplished with a fluid divider. However it has been found that problems arise in designing a fluid divider which will maintain a substantially constant flow of fluid to each motor when very high fluid pressures are involved.

One method used for multiple motors as found in U.S. Pat. No. 3,135,079 which connects the motors in series, and uses a pressure relief valve which bypasses fluid to the sump when the pressure setting is exceeded. In operation if the first motor of such a series overloads then it will dump the hydraulic fluid to the sump which will lessen the amount of fluid supplied to the following motors in the series. This will result in slowing of the following motors which would not be generally desired. Accordingly, it is another object of the invention to provide a hydraulic drive system for multiple hydraulic motors which will maintain a substantially constant flow of fluid to all of the motors when one or more motors experiences excessive loading. Thus all motors operate independent of one another.

SUMMARY OF THE INVENTION

The invention comprises a hydraulically driven mower for connecting with a prime mover. The mower has a rotary-type cutting means for mowing and which rotary-type cutting means creates air flow during cutting. Heat transfer means are provided on the mower frame and positioned so that air flow created by the rotary cutting means removes heat from hydraulic fluid therein to provide cooling of the hydraulic fluid during mowing. The heat transfer means includes structural members of the mower deck or frame so that the housing of the mower can act as a heat sink and provide cooling. The hydraulic drive system includes at least two hydraulic motors connected in series with pressure relief means connected in parallel with each motor to bypass hydraulic fluid in case of overloading.

BRIEF DESCRIPTION OF THE PREFERRED EMBODIMENT

Figure 1:
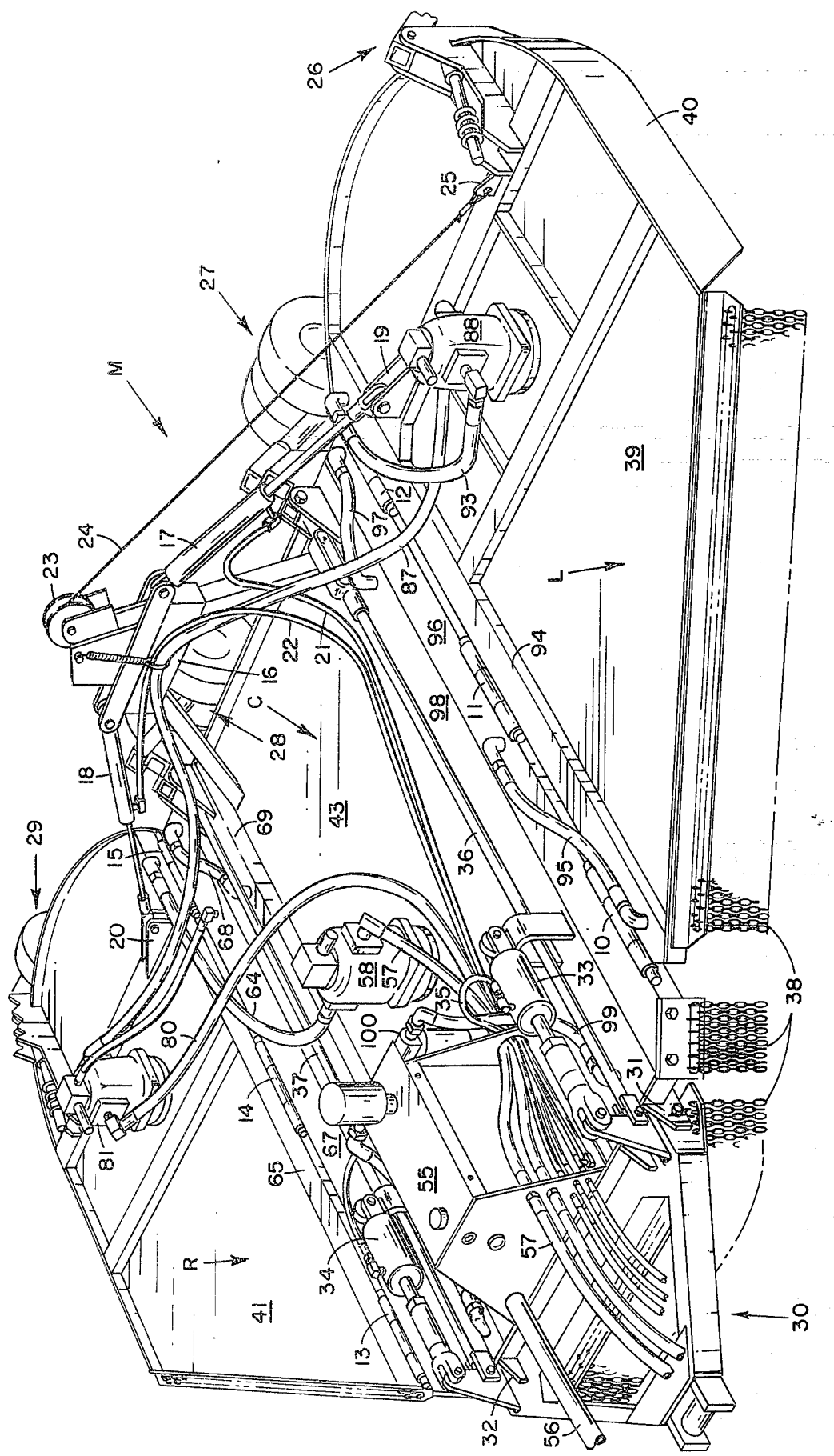
FIG. 1 is a perspective partial view showing a tri-section rotary mower embodying the invention.

Referring to FIG. 1 of the drawings, there is shown a tri-sectional mowing apparatus M which is adapted to be attached to a prime mover such as a tractor (not shown). The mowing apparatus M concludes a center section C and left and right wing sections L and R, respectively. The wing sections are connected to the center section through hinges 10, 11, 12, 13, 14 and 15. This allows the wing sections to be folded up for highway transport. A lifting frame 16 is secured with the center section and includes hydraulic cylinders 17 and 18 which are secured to brackets 19 and 20 which are secured to the left and right wing sections, respectively. Hydraulic fluid is supplied to the cylinders 17 and 18 through hydraulic supply lines 21 and 22, respectively. A mechanical winch 23 may also be provided to lift the left and right wing sections through a cable 24 which may be removably secured to each of the wing sections such as by bracket 25.

Adjustable support wheel units 26, 27, 28 and 29 are provided at the rear of the center, right and left wing sections for rolling support thereof. A front hitching means 30 is provided for connecting the mowing apparatus to a prime mover such as a tractor. The hitching means is pivotally mounted to the center section through brackets 31 and 32 so that it may be pivoted upwardly and downwardly by hydraulic lifting cylinders 33 and 34 which are supplied fluid through hydraulic line 35. Link members 36 and 37 interconnect the hitching means 30 and the support wheel units 27 and 28 so that activation of the cylinders 33 and 34 to their extended position will raise the central unit of the mower which likewise raises and lowers the left and right wing sections. The center and left and right wing sections are maintained substantially level during this lifting operation since the hitching means also raises the front portion of the mowing apparatus as the support wheel units 27 and 28 raise the rear portion. Safety chain curtains 38 are provided at the front of the mowing apparatus and safety chain curtains (not shown) which are known in the art are also provided at the rear of the mowing apparatus to prevent the mowing blades from throwing debris and materials from under the mower.

The left wing section L includes a generally flat deck member 39 with a solid side portion 40. The right wing section R includes a similar flat deck member 41 having a solid side portion 42. The center section C includes a flat deck member 43.

The mowing machine heretofor described is of generally conventional construction of the type which has previously been powered by rotary shafts and gear boxes. It is at this point that the similarity in a mechanically driven unit and the hydraulically powered unit of the invention diverge. As will be explained more fully hereinafter, the mower of the invention is powered by three hydraulic motors and includes a oil reservoir mounted on the mower which is connected to a auxiliary pump for supplying hydraulic fluid under pressure to the hydraulic motors.

Figure 2:
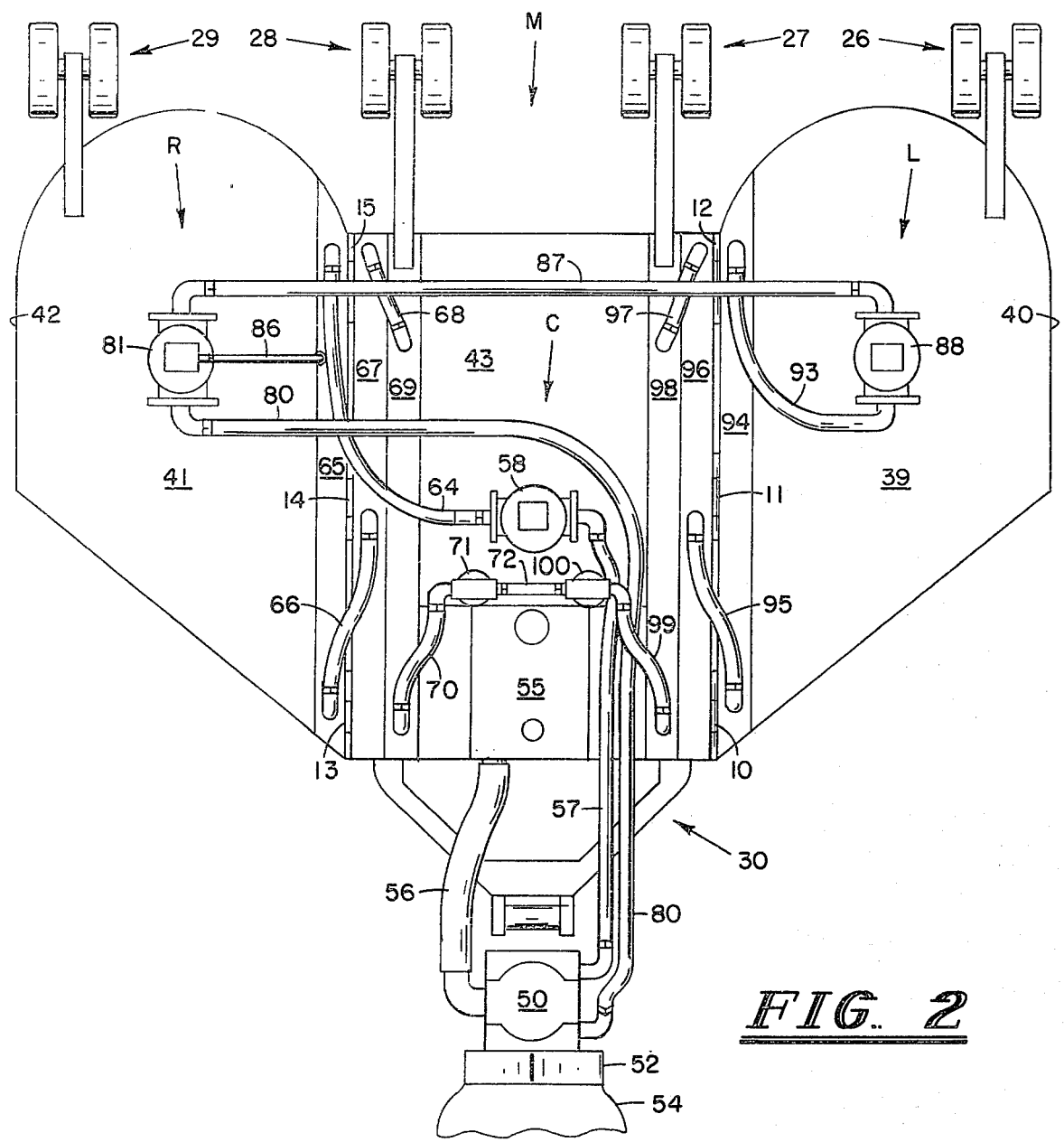
FIG. 2 is a partial top view of a tri-section rotary hydraulically driven mower embodying the invention.
Figure 4:
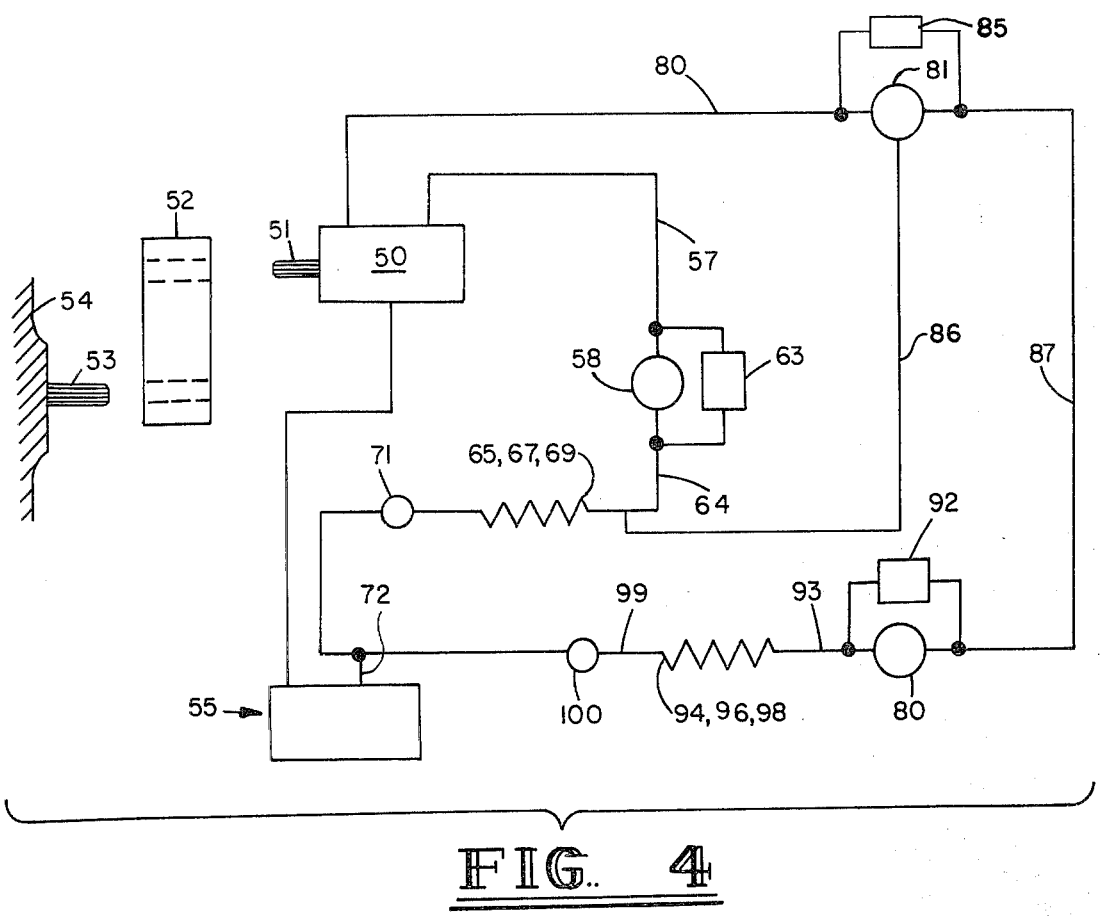
FIG. 4 is a schematic view of the hydraulic system of the invention.

The hydraulic system of the mowing apparatus M can best be visualized from FIGS. 2 and 4. The system includes a hydraulic gear-type pump 50 having two sections. The pump includes an input shaft 51 which is connected to a 4:1 gear increaser 52. The gear increaser 52 is connected to a PTO output shaft 53 which is driven by the power source 54 which typically may be a tractor.

A typical RPM for the PTO output shaft is 540 RPM's so that the gear increaser will drive the pump at 2160 RPM's. It is understood that the gear increaser might be changed accordingly in the case of a 1000 RPM PTO output shaft. The pump 50 might also be changed to any pump which would meet the requirements of fluid flow and pressure and which may eliminate the need for the speed change.

A sump or oil storage container 55 is mounted on the center section C for holding a supply of hydraulic fluid. Fluid exits the sump 55 through pump input hose 56 which is connected to the input of the pump 50. It is understood that the hose 56 is of the flexible rubber type to allow relative movement between a prime mover and the mowing apparatus M during turning.

A first flexible output hose 57 is connected to one section of the pump 50 and is connected to the hydraulic motor 58 which powers the updraft blade means 59 for the center section. Blades means 59 includes a central mounting hub 60 and two updraft blades 61 and 62 to cut vegetation. The updraft blades 61 and 62 act to suck up vegetation into the cutting plain of the blades during operation and circulate air over the cooling members. Blade means 59 are of conventional construction of the type which may be used on any rotary mowing machine.

The hydraulic motor 58 includes a relief valve means 63 which is set to bypass fluid around the motor 58 and through the exhaust line 64. The relief valve 63 may be typically set to bypass fluid when the fluid pressure exceeds 2500 pounds per square inch. This might occur should the blade 61 or 62 strike an object and stop rotation of the motor 58 which would greatly increase the pressure. This eliminates the need for typical slip clutches which are conventionally used in mechanically driven drive systems.

Fluid exiting the motor 58 travels through the exhaust line or hose 64 to the rear end of hollow, fluid-conducting frame member 65 which forms a conduit extending along the flat deck member 41. The hydraulic fluid travels substantially the length of the frame member 65 where it exits into flexible hose 66 so that it passes through hollow, fluid-conducting frame member 67 which forms another conduit. The hollow frame member 67 is mounted on the solid deck member 43 of the central section. The fluid travels rearwardly through the hollow frame member 67 where it exits through a flexible hose 68 and enters hollow, fluid-conducting frame member 69 which is also connected to the flat deck member 43 of the central section. Hollow frame member 69 forms a conduit so said fluids travel forwardly therethrough until it exits flexible hose 70 which is connected to filter means 71. Fluid then travels through conduit 72 into sump 55 for recirculation through the system. As will be apparent from FIG. 3, during operation of the hydraulic pump 50 which provides fluid flow through the central hydraulic motor 58 the hydraulic fluid is flowing through the hollow, fluid-conducting frame members 65, 67 and 69 which in turn have air flow over the lower portion thereof created by the mowing blades. The hollow, fluid-conducting frame members 65, 67 and 69 are sized to provide sufficient cooling through their heat transfer surfaces. As shown the flat deck is in direct contact with one side of the conduit. Debris may collect and cover the frame members during operation which could effect heat transfer. However, the deck member lower surface is contacted by the air flow from the blades which provide heat transfer from the fluid in the frame members which are rigidly secured to the deck such by welding. The heat from the hydraulic fluid is conducted from the frame members through the deck which acts like a fin to provide some cooling.

The left and right wing sections are driven by the second stage of the pump 50 which includes flexible output line 80 which supplies hydraulic fluid to the right hydraulic motor 81. The right hydraulic motor 81 is connected to a central mounting hub 82 which in turn is connected to updraft blades 83 and 84 of the same general type as updraft blades 61 and 62. Hydraulic motor 81 includes a relief valve 85 which bypasses fluid from the motor 81 to flexible line 87 when the pressure exceeds 1750 pounds per square inch. Flexible line 81 is connected to the next motor so it does not lose performance when motor 81 slows or stops. This would occur such as when blades 83 or 84 strike an object stopping or slowing rotation of the hydraulic motor. An external drain line 86 as shown in FIG. 2 is provided to drain any enternal leakage past the motor gear pressure plates to the hollow frame member 65. The drain line 86 is required since the outlet of motor 81 does not go directly to the sump. Hydraulic fluid exits the outlet of motor 81 through flexible line 87 which directs it to the left hydraulic motor 88.

The left hydraulic motor 88 is also connected to a central mounting hub 89 which in turn is connected to updraft blades 90 and 91. The central mounting hubs of all three sections as well as the blades of all three sections are of substantially the same construction which is of a conventional variety. Accordingly, no further description is provided thereof.

The hydraulic motor 88 includes a relief valve 92 as shown schematically in FIG. 4. The relief valve 92 is set to bypass fluid from the mower when the pressure exceeds 1750 pounds per square inch. As with the other relief valves, the purpose of relief valve 92 is to bypass fluid such as when blade 90 or 91 strikes an object causing a sudden increase in pressure in the hydraulic system. Fluid is exhausted from the motor 88 through line 93 which directs the hydraulic fluid through the rear end of hollow, fluid-conducting frame member 94 which forms a conduit extending the length of the deck 39. As with the other hollow frame members, member 94 is sealingly secured to the deck 39 which comes is in contact with the air flow from the blades. The hydraulic fluid flows through the hollow frame member 94 and exits through flexible hose 95 which directs the hydraulic fluid into hollow, fluid-conducting frame member 96 which is mounted on the central flat deck member 43 and extends the length thereof. As with the other hollow frame members, hollow frame member 96 forms a conduit for flowing the hydraulic fluid passing therethrough. The hydraulic fluid exits the hollow frame member 96 through flexible line 97 which directs it into hollow, fluid-conducting frame member 98 which is also in contact with the central flat deck portion 43 and extends longitudinally the length thereof. The fluid exits the hollow frame member 98 through flexible line 99 which directs the hydraulic fluid into filter 100 which is connected to conduit 72 which directs the hydraulic fluid back into the sump 55.

Figure 3:
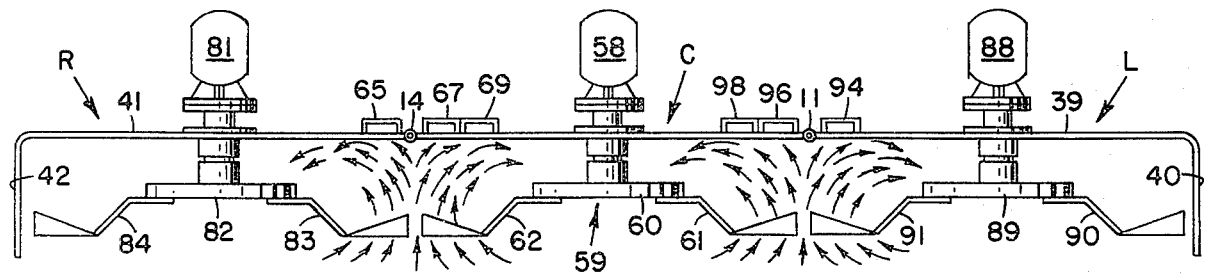
FIG. 3 is a schematic cross-section view depicting the air flow of the cutting blades against the board deck to provide cooling of the hydraulic fluid in the structural members.

The hollow frame members 65, 67, 69, 94, 96 and 98 are rigidly secured in contact with the central and left and right sections of the mowing apparatus. They are of course sealed at their ends and are sufficient strength for the frame as well as for conducting the low pressure hydraulic fluid. As previously described their contact with the flat deck members of the three sections transfer heat thereto so that the flow of air as shown in FIG. 3 created by the rotation of the updraft blades helps transfer heat from the hydraulic fluid flowing in the frame members. The amount of heat transfer as determined by their effective heat transfer surface areas is predetermined to provide cooling to the hydraulic fluid in the system to protect the hydraulic fluid from overheating. The integral heat exchanger deck arrangement is preferred since it utilizes the air flow from the updraft blades which increases the cooling of the hydraulic fluid. Other configurations of fluid-conducting members could be utilized which would provide sufficient heat transfer from the hydraulic fluid to prevent overheating which could damage the hydraulic fluid. The frame members are shown on the upper surface of the deck members which provides a smooth deck member lower surface. Other possible arrangements of fluid-conducting members would require sufficient heat transfer capabilities as determined by the needs of the system. It is contemplated that the air flow from the blades would be used with whatever arrangement to provide the necessary cooling to protect the hydraulic fluid from overheating.

While there has been shown and described a preferred embodiment of a hydraulically driven mower in accordance with the invention, it will be appreciated that many changes and modifications may be made therein without, however, departing from the essential spirit of the invention within the scope and the claims.

I claim:

1. A hydraulically driven rotary mower comprising:
a deck member;
at least two hydraulic motors;
rotary cutting blade means operatively connected to said hydraulic motors and positioned adjacent said deck member wherein air flow generated by rotation of said blade means impinges upon said deck member;
hydraulic fluid conduit means for circulating hydraulic fluid operatively connecting said hydraulic motors with a source of hydraulic pressure wherein said hydraulic fluid conduit means is in contact with said deck member to provide sufficient heat transfer from the hydraulic fluid to the deck member whereby the contacting relation of said hydraulic fluid conduit means and said deck member serves as a heat transfer means for transferring sufficient heat from hydraulic fluid circulating in said hydraulic fluid conduit means to said deck member which deck member serves as heat dissipation means by utilizing the air flow from the blade means for cooling to prevent overheating and damage to the hydraulic fluid.

2. The mower as set forth in claim 1, wherein:
the hydraulic fluid conduit means includes at least one structural member forming a portion of a mower frame.

3. The mower as set forth in claim 1, wherein:
the hydraulic fluid conduit means includes a plurality of elongated structural members forming a portion of a mower frame.

4. The mower as set forth in claim 1, wherein:
the hydraulic fluid conduit means includes a plurality of elongated conduits mounted on a mower deck member.

5. The mower as set forth in claim 1, wherein:
the mower includes a central section and two side sections, each having a hydraulic motor operatively connected with rotary cutting means for mowing.

6. The mower as set forth in claim 1, wherein;
the rotary cutting blade means includes a blade means rotating about a generally vertical shaft.

7. A hydraulically driven tri-section rotary mower, comprising:
a central section with right and left wing folding sections connected thereto;
at least one hydraulic motor operatively connected with each section and having a rotary cutting blade means connected with the hydraulic motor for mowing;
each section comprising a generally flat deck member the lower surface of which is contacted by the air flow from the rotary cutting blades; and
a plurality of longitudinally extending frame members which provide conduit means for flowing hydraulic fluid therethrough for driving the hydraulic motors and which contact the flat deck members to dissipate heat through the deck members to provide sufficient heat transfer thereto so that air flow created by the rotary cutting blade means will provide sufficient heat transfer from the hydraulic fluid in the conduit means through the deck members to provide cooling of the hydraulic fluid during operation of the rotary cutting blade means to prevent overheating of and damage to the hydraulic fluid.

* * * * *